United States Patent [19]
Andreolla

[11] Patent Number: 4,531,767
[45] Date of Patent: Jul. 30, 1985

[54] CONNECTING PIECE FOR A LINE OR AN APPARATUS TO BE SCREWED THEREIN TO PROVIDE A CLOSED PRESSURE-FLUID CIRCUIT AND METHOD OF MANUFACTURING SAME

[75] Inventor: Florian Andreolla, Dottikon, Switzerland

[73] Assignee: Merzia Baumgartner, Dottikon, Switzerland

[21] Appl. No.: 621,126

[22] Filed: Jun. 14, 1984

Related U.S. Application Data

[63] Continuation of Ser. No. 395,292, Jul. 6, 1982.

[30] Foreign Application Priority Data

Jul. 6, 1979 [CH] Switzerland ............... 6320/79

[51] Int. Cl.³ ............................................. F16L 5/02
[52] U.S. Cl. ..................................... 285/220; 285/349
[58] Field of Search ............... 285/220, 171, 219, 212, 285/349, 355, DIG. 19

[56] References Cited

U.S. PATENT DOCUMENTS

| | | | |
|---|---|---|---|
| 1,365,151 | 1/1921 | Burke | 285/349 X |
| 2,553,222 | 5/1951 | Wallgren et al. | 285/DIG. 19 |
| 2,701,871 | 2/1955 | Rauch | 285/DIG. 19 |
| 3,074,748 | 1/1963 | Ulrich | 285/212 X |
| 3,173,712 | 3/1965 | Zahurance et al. | 285/355 |
| 3,212,796 | 10/1965 | Neuschstz | 285/212 X |
| 3,542,381 | 11/1970 | Hait | 285/349 X |
| 3,850,456 | 11/1974 | Hanback et al. | 285/212 X |
| 4,150,836 | 4/1974 | Walker | 285/412 X |

FOREIGN PATENT DOCUMENTS 2610775  9/1975  Fed. Rep. of Germany.
1308769 10/1962  France ............................. 285/220

Primary Examiner—Dave W. Arola
Attorney, Agent, or Firm—Oblon, Fisher, Spivak, McClelland & Maier

[57] ABSTRACT

The connecting piece includes a hollow many-sided head and a hollow screw which forms one piece with the many-sided head. The screw is provided with an external thread so that it can be screwed into the internal thread of a part of a line or an apparatus. A chamber-like circular recess is worked from below into the many-sided head in the proximity of the end of the thread of the screw. The circular recess is worked into the many-sided head in one operation. The cutting tool is first guided into a gate at the end of the thread of the screw perpendicularly to the longitudinal axis of the connecting piece. Thereafter the cutting tool is guided into the bottom surface of the many-sided head in parallel with the longitudinal axis of the connecting piece. In this way a guide surface at the end of the thread of the screw is formed which is free of obstacles. The insertion of the sealing ring into the circular recess is simplified because the sealing ring is guided along the guide surface into the recess without a great effort and without being injured. By tightening the connecting piece the deformation of the sealing ring is limited in an optimal way because the metal of the many-sided head lies on the metal of the part to be connected.

1 Claim, 4 Drawing Figures

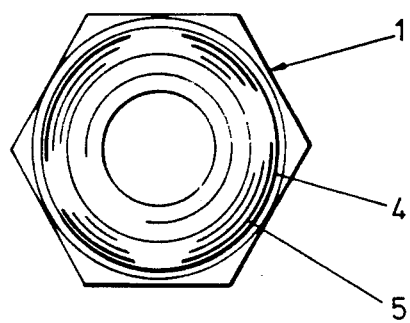
FIG. 2
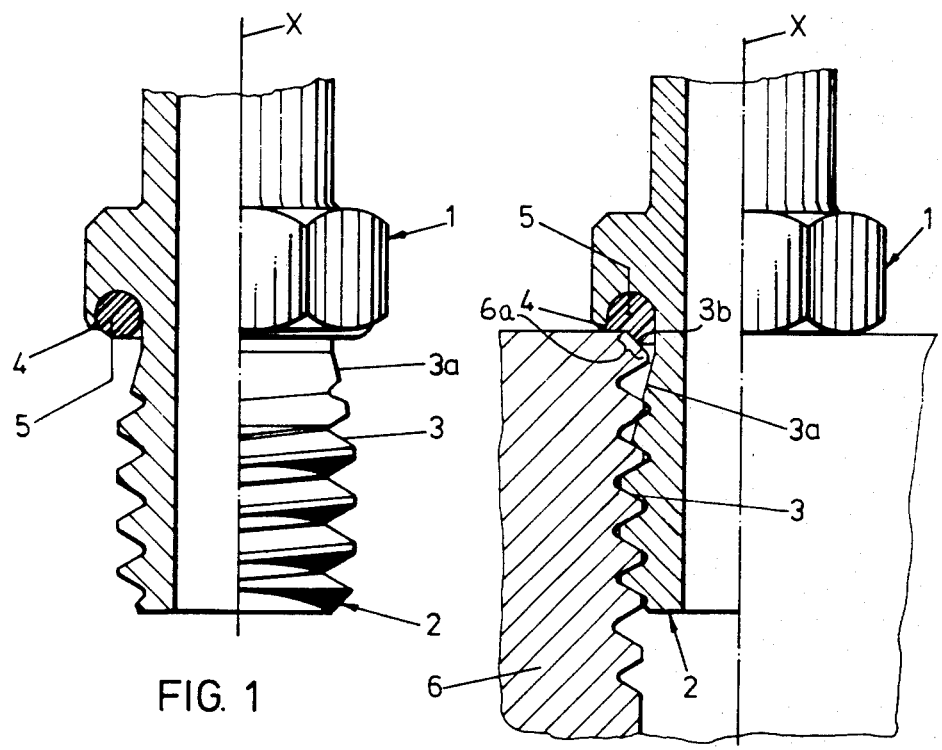
FIG. 1
FIG. 3

— CONNECTING PIECE FOR A LINE OR AN APPARATUS TO BE SCREWED THEREIN TO PROVIDE A CLOSED PRESSURE-FLUID CIRCUIT AND METHOD OF MANUFACTURING SAME

This application is a continuation of application Ser. No. 395,292, filed July 6, 1982.

BACKGROUND OF THE INVENTION

1. Field of the Invention

The invention relates to a connecting piece for a line or an apparatus to be screwed therein to provide a closed pressure-fluid circuit, said connecting piece comprising a hollow many-sided head and a hollow-screw with a thread, said hollow screw being in one piece with said hollow many-sided head.

2. Description of the Prior Art

It is known to use varnishes, pastes, putties, fibres, foil strips, taper threads and sealing rings as sealing means to eliminate the pressure losses between the connecting pieces and the respective parts to be connected together by these connecting pieces. The pressure flowing in the circuit is either a pressure liquid or a pressure gas.

The first five sealing means can impair the function of the lines or the apparatuses when they get into the inside of these parts. Taper threads often destroy the apparatus or line portions by means of their wedge effect. When the sealing rings are squeezed only a little too powerfully, they burst or they are dislocated from the wanted position. The inappropriate deformation of the sealing ring by the tightening of the connecting piece causes a premature aging of the sealing ring by means of which the sealing efficiency of the same is reduced or is practically zero.

All the known above described connecting systems have a common disadvantage that the sealing means have to be renewed in each case when the connecting piece is reused.

It is further known from a proposal to an international standard ISO/DIS 6149 that a sealing ring is inserted between the connecting piece and the part to be connected in such a way that it abuts on one side against the wall of the thread end of the screw running parallel with the longitudinal axis of the connecting piece and on the other hand against a wall of the part to be connected running conically outwardly from the longitudinal axis of the connecting piece.

In this case the forces act against the wall running parallel with the longitudinal axis of the connecting piece. This wall will be deformed in the perpendicular direction to the longitudinal axis of the connecting piece in a short time.

The screw of the connecting piece has a gate at the thread end (in the proximity of the many-sided head) which gate is implied by the instrument in the course of cutting the thread.

It is known to cut a circular recess for a sealing ring into an angle formed by the thread end and the bottom surface of the many-sided head, which recess is inclined in 45° to the longitudinal axis of the connecting piece. Such a recess has, however, an edge formed by an obtuse angle which is the source of damage of the sealing ring when it is inserted into the circular recess.

It is further known to provide a circular recess in the bottom surface of the many-sided head in such a way that the gate at the thread end will not be cut, but a circular recess will be cut only in the bottom surface of the many-sided head away from the thread end of the screw. However, when the sealing ring is not optimally dimensioned to suit the overall dimensions of the circular recess, the metal part of the many-sided head and the metal of the part to be connected can not be brought to lie on each other and the sealing ring introduced into such a circular recess will be so heavily deformed that it will be soon destroyed. Besides, in such a case the sealing ring can be injured by the edge of the circular recess, when it is inserted into the same. The mounting of the sealing ring into such a recess is difficult.

SUMMARY OF THE INVENTION

It is an object of the invention to provide a connecting piece the form of which is such that the inappropriate deformation of the sealing ring and its dislocation from the intended position are eliminated. The connecting piece is further constructed in such a way that the sealing ring which has been once inserted into the same should not be impaired in its properties during the several reassemblies of the connecting piece; such a sealing ring should be reusable several times.

Another significant object of the present invention aims at providing a connecting piece having a chamber-like circular recess in the many-sided head of the connecting piece such that the circular recess has a guide surface enabling an easy introduction of a sealing ring into the circular recess, and the sealing ring should not be injured during its introduction and should not be dislodged from its right position in the circular recess. Such a circular recess is produced by means of a single cutting tool; it allows the use of the sealing rings currently available on the market.

According to the invention a chamber-like circular recess for a sealing ring is worked into the many-sided head of the connecting piece in the proximity of the thread end of the screw.

The manufacturing of such a connecting piece includes the following steps.

Guiding the cutting tool in one working operation first perpendicularly to the longitudinal axis of the connecting piece into the gate at the thread end of the screw and then guiding the cutting tool parallel to the longitudinal axis of the connecting piece into the bottom surface of the many-sided head, whereafter the cutting tool will be retracted after the circular recess has been completed. It is advantageous when the circular recess is formed as a dish-shaped groove that the sealing ring to be inserted in the same has a circular cross-section, or when the circular recess is formed as a capsular notch that the sealing ring to be inserted into the same has a multi-angular cross-section.

Various other objects, features and attendant advantages of the present invention will be more fully appreciated as the same becomes better understood from the following detailed description when considered in connection with the accompanying drawings in which like reference characters designate like or coresponding parts throughout the several views and wherein:

BRIEF DESCRIPTION OF THE DRAWINGS

FIG. 1 shows an elevation of the connecting piece having a chamber-like circular recess and a sealing ring inserted therein, partially in section, FIG. 2 shows an elevation from below of the many-sided head of the connecting piece according to FIG. 1 having a chamber-like circular recess and a sealing ring inserted therein, FIG. 3 shows an elevation of the connecting piece according to FIG. 1 screwed into a part to be connected, partially in section.

DETAILED DESCRIPTION OF THE PREFERRED EMBODIMENT

Figure 4:
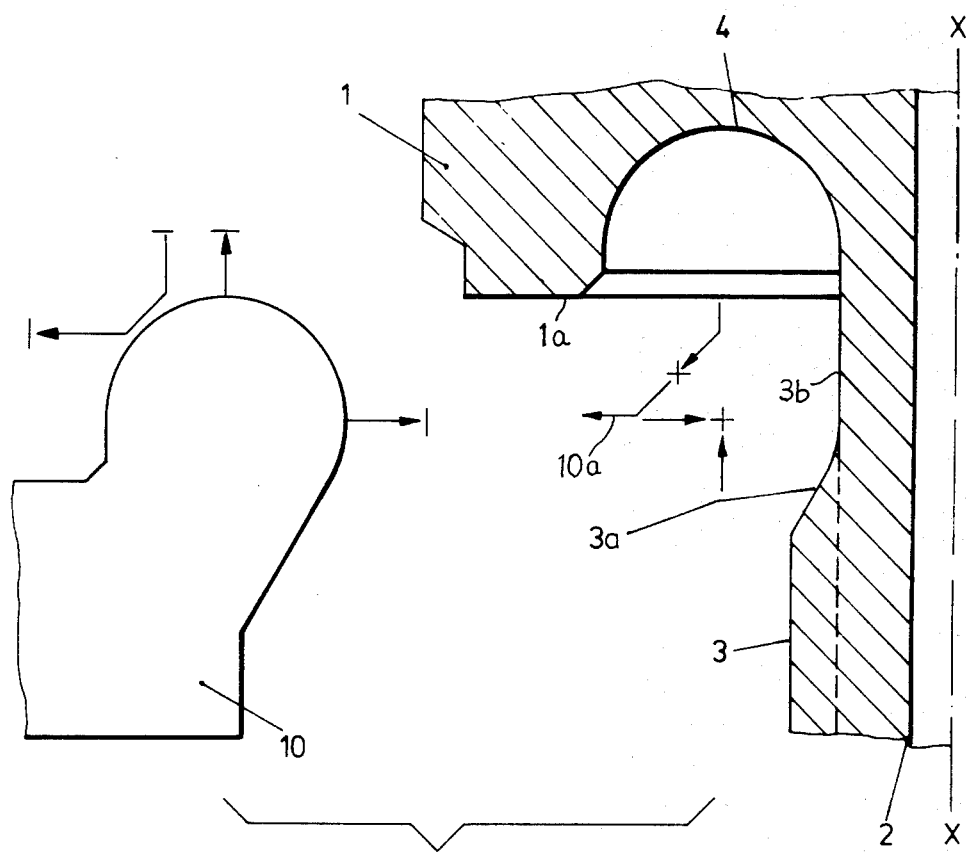
FIG. 4 shows an elevation of the connecting piece according to FIG. 1 and of a cutting tool by means of which a circular recess is produced in the many-sided head of the connecting piece.

The connecting piece according to FIG. 1 comprises a hollow many-sided head 1 and a hollow screw 2 which forms one piece with the many-sided head 1. When the connecting piece is screwed into a part 6 of a line or an apparatus to provide a closed pressure-fluid circuit, the many-sided head 1 serves for setting a wrench thereon by means of which the connecting piece is screwed into the part 6 and finally tightened. The screw 2 is provided with an external thread 3 the end 3a of which lies in the proximity of the many-sided head 1. A chamber-like circular recess 4 is worked into the many-sided head 1 from below in the proximity of the thread end 3a; a sealing ring 5 is inserted into the circular recess 4. The end 3a of the external thread 3 merges gradually and smoothly to a wall of the recess 4 to form a guide surface.

The circular recess can be formed as a dish-shaped groove, as it can be seen in FIGS. 1 and 3. A sealing ring having a circular cross-section is inserted in such a dish-shaped groove. The circular recess can also be formed as a capsular notch into which a sealing ring having a multi-angular cross-section is inserted.

An annular wedge shaped receiving chamber 3b is defined by the guide surface of thread end 3a, the surface of the receiving part 6 which extends transverse to the axis X, and a tapered entrance portion 6a of the receiving part 6, as well as the recess 4. The dish shape recess or groove 4 provides a close fit with the sealing ring over the semicircular extent of the recess when the sealing ring is in an uncompressed state.

During the tightening of the connecting piece into the part 6 the protruding portion of sealing ring 5 will be squeezed in the direction along the longitudinal axis X of the connecting piece and only into the receiving chamber 3b. In this case the metal of the many-sided head 1 lies on the metal of the part 6, as it can be seen in FIG. 3. Owing to this the deformation of the sealing ring 5 is limited in an optimal way. The sealing ring 5 is held by the recess 4 and by the receiving chamber, and so will not be squeezed outwardly and damaged by compression between the multisided head and the receiving part as the connecting piece is tightened down and fully screwed into the receiving part.

The steps for manufacturing the connecting piece are as follows.

A cutting tool 10 shown diagrammatically in FIG. 4 is guided in one working operation into a gate at the thread end 3a of the screw 2 perpendicularly to the longitudinal axis X of the connecting piece. This gate was formed during the cutting of the thread 3 of the screw 2. The cutting tool 10 is then guided into the bottom surface 1a of the many-sided head 1 in parallel with the longitudinal axis X of the connecting piece. In these steps a chamber-like circular recess 4 is worked into the many-sided head 1, into which recess 4a sealing ring not shown is inserted.

During the retraction of the cutting tool 10 from the completed circular recess 4 the cutting tool 10 is guided in parallel with the longitudinal axis X of the connecting piece. It is advantageous that the cutting tool 10, during the retracting movement from the circular recess 4, makes shortly before its zero-position an additional movement perpendicularly away from the longitudinal axis X of the connecting piece, as shown by line 10a, in order to chamfer the edge of the circular recess 4.

In this way a guide surface 3b being the continuation of the thread end 3a of the screw 2 is provided. This guide surface 3b passes from the thread end 3a into the wall of the circular recess 4 without obstacles. In this way the mounting of the sealing ring is simplified, because the sealing ring can be inserted into the circular recess 4 across the guide surface 3b without injury. The sealing rings which are currently available on the market can be used as the sealing rings with this type of connecting piece. The circular recess 4 will be produced with a single cutting tool.

The sealing ring inserted into the circular recess guarantees a reliable sealing effect and can not be shifted from the provided position. Consequently a premature aging of the sealing ring is eliminated, whereby the sealing ring can be reused for several mountings without impairment of its properties.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A connecting piece to be screwed into a receiving part to provide a closed pressure-fluid circuit together with a sealing ring having a circular cross section, said connecting piece comprising a hollow multi-sided head and a hollow screw with a male thread, said hollow screw being in one piece with said hollow multi-sided head, an annular chamber-like recess for said sealing ring formed by said hollow screw and said hollow multi-sided head, wherein said annular chamber-like recess lies in the proximity of one end of the male thread of said hollow screw, said one end of said male thread merging smoothly and gradually into a wall of said annular chamber-like recess so as to form a guide surface in the direction of the longitudinal axis of said connecting piece for inserting said sealing ring into said recess, wherein said annular chamber-like recess is formed as a dish-shaped groove shaped to provide a close fit with said sealing ring having a circular cross section over a semicircular extent of said recess in the uncompressed state, wherein an annular wedge shaped receiving chamber is defined by said guide surface, a tapered entrance portion of said receiving part, a surface of said receiving part extending transverse to said connecting piece longitudinal axis when said connecting piece is inserted into said receiving part, and said dish shaped groove, and wherein said hollow multi-sided head further comprises means for causing a portion of said sealing ring to protrude into said receiving chamber and be squeezed along the longitudinal axis of said connecting piece upon tightening of said connecting piece into said receiving part, whereby said sealing ring is held by said recess and said sealing chamber so that said multi-sided head directly contacts said receiving part when said connecting piece is fully screwed into said receiving part.

* * * * *